SUPPRESSION OF NOISE TRANSMISSION IN A NETWORK

Filed Oct. 24, 1966 2 Sheets-Sheet 1

INVENTORS
DANIEL R. MAZZIOTA
SAMUEL BAYER
BY Arthur O. Klein
ATTORNEY

SUPPRESSION OF NOISE TRANSMISSION IN A NETWORK

Filed Oct. 24, 1966 2 Sheets-Sheet 2

INVENTORS
DANIEL R. MAZZIOTA
SAMUEL BAYER
BY Arthur O. Klein
ATTORNEY

United States Patent Office 3,534,268
Patented Oct. 13, 1970

3,534,268

SUPPRESSION OF NOISE TRANSMISSION IN A NETWORK

Daniel R. Mazziota, 3 Cornwall Lane, Carle Place, N.Y. 11514, and Samuel Bayer, 19 Virginia Ave., Rockville Centre, N.Y. 11570

Filed Oct. 24, 1966, Ser. No. 588,814
Int. Cl. H04b 1/10, 15/00
U.S. Cl. 325—478 12 Claims

ABSTRACT OF THE DISCLOSURE

A carrier-activated noise squelch circuit is designed for incorporation into the IF stage of a narrow band superheterodyne receiver. The circuit includes an oscillator-limiter arrangement which, in the absence of the carrier, generates a control signal having a frequency outside the IF passband for adjusting a variable IF attenuator in the transmission path to a high impedance state, thereby preventing spurious noise from reaching the detection and audio stages of the receiver. In the presence of a carrier, however, the oscillator is disabled and the resultant loss of control signal causes the attenuator to operate in a low impedance state to permit transmission of the carrier to the detector. The time constants of the squelch circuit are chosen to provide squelch operation in the presence of high amplitude noise impulses. The oscillator may be interposed in the transmission path in front of the attenuator; alternatively, the oscillator may be driven by a separate IF prelimiter interposed in the path and operating in a band centered upon but smaller than the usable IF band to retain high receiver sensitivity without compromising the reliability of squelch operation.

This invention relates to communications networks and, more particularly, to narrow-band receivers arranged to be operative only when a carrier is being received. Accordingly, it is a general object of the invention to provide new and improved apparatus of this character.

Communications receivers, particularly of the type used in two-way mobile radio equipment, are customarily left in a stand-by condition to receive any messages transmitted over the air. During the intervals when no messages are being received from a distant transmitter, random noise signals generated both externally and internally of the equipment are intercepted and reproduced. Thus, for example, ignition noises, atmospheric noise, noises, generated by motors or similar electrical devices, as well as "shot noise" generated within the active elements of the receiver are ultimately reproduced in the audio circuitry and the speaker unless some means are provided for suppressing them. Circuits capable of providing at least a limited degree of such suppression (hereafter referred to as "squelch control circuits") have been uitlized with some success.

In narrow-band receivers (i.e., those in which the intelligence of the received message is carried in a frequency band that is comparable to the bandwidth of the receiver), such squelch control circuits are generally operated by the carrier wave bearing the message intelligence usually after such carrier has been converted to the intermediate frequency of the receiver. Generally speaking, existing I.F. squelch control circuits of this type suffer from at least one of several disadvantages.

In the first place such circuits are frequently adapted to squelch noise transmission only after detection, i.e., by disabling the audio portion of the receiver. Accordingly, such squelch control circuits may not be particularly suitable for use in suppressing the noise output of frequency converters employed in mobile radio systems. These converters frequently are separable units which may be physically housed in a different location from the detection and audio circuits of the receiver. This effectively precludes the possibility of building the squelch circuit as an internal part of the converter.

Secondly, many presently known squelch control circuits are susceptible to impulse noise (e.g., ignition noise) which contains components within the passband of the receiver and may, therefore, itself operate the squelch control circuit, thereby permitting the transmission of noise to the speaker.

Additionally, receivers employing such circuitry may suffer a loss of sensitivity, particularly in areas of low fringe signal reception. This is because the I.F. squelch threshold level (i.e., the magnitude of the I.F. signal level that causes the squelch control circuit to operate) must be made significantly higher than the receiver noise level to prevent the latter from activating the squelch control circuit. Thus, a received signal below the I.F. squelch threshold will be suppressed.

Another object of the invention, therefore, is to provide an improved signal-operated squelch control circuit for a narrow-band communication receiver, the circuit designed to avoid some or all of the above disadvantages.

These and related objects are attained in an illustrative embodiment of the instant invention, in which a narrow-band mobile frequency converter operating with a received message-modulated carrier is provided with a self-contained I.F. controlled squelch circuit. This circuit employs an oscillator-limiter network which, in the absence of the carrier, operates as an oscillator and generates an A.C. control signal at a frequency outside the I.F. band. Means are provided for converting the oscillator output to a D.C. control voltage which, when above a predetermined threshold magnitude, maintains a variable I.F. attenuator at the output of the converter in a high impedance state. This prevents the transmission of noise from the converter to the following receiver circuitry, e.g., the detection and audio stages located in a different portion of the vehicle.

When the carrier is received at the converter, the limiter portion of the oscillator deactivates the latter and effects the reduction of the D.C. control voltage below the threshold level. When this occurs, the output attenuator is switched to its low impedance, or transmitting, state.

The squelch circuit may be provided with time delay means (partially dependent upon the deactivation time of the oscillator-limiter) for maintaining the D.C. control voltage above the threshold value when spurious noise impulses are present. As a result, such impulses are prevented from operating the squelch control circuit.

In order to maintain high receiver sensitivity without unduly compromising the reliability of the squelch control circuit, the oscillator-limiter is advantageously disposed outside the main signal path of the converter and is coupled thereto through an auxiliary filter-amplifier whose bandwidth is centered upon, but reduced with respect to, the usable I.F. band of the receiver. In this way, the main signal path can operate at a relatively lower signal-to-noise ratio than is necessary to trigger the squelch circuit itself. Preferably the input of the auxiliary filter is coupled to the output of a noise prelimiter disposed in the main signal path to minimize the required reduction in bandwith of the auxiliary filter for a given degree of receiver sensitivity.

The nature of the present invention and its various advantages and features will appear more fully from the following detailed description taken in connection with the appended drawing, wherein.

Figure 1:
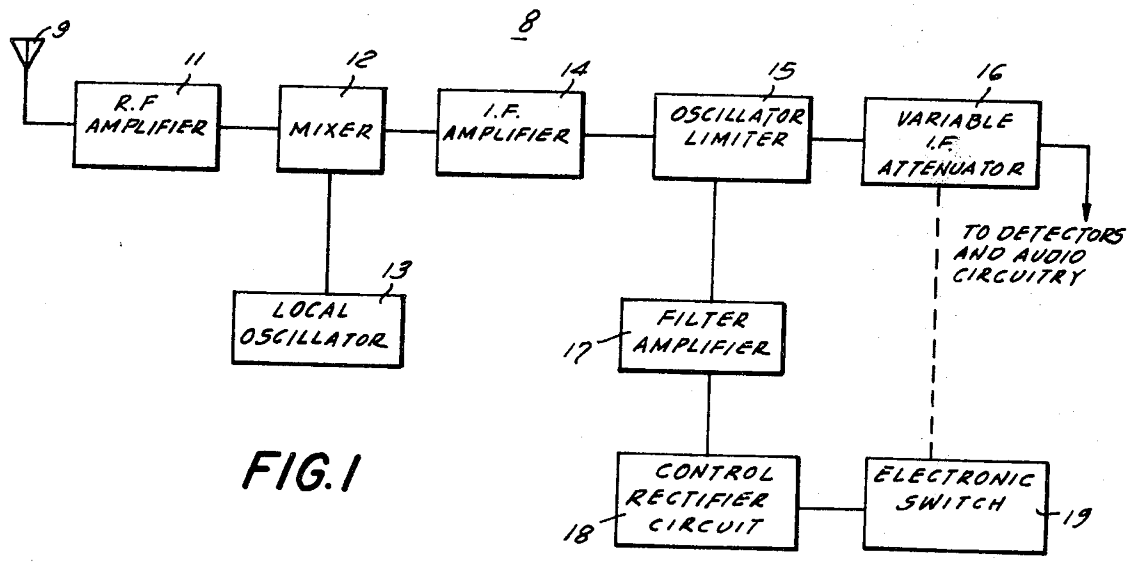
FIG. 1 is a block diagram of an illustrative frequency converter operating with a signal-operated squelch control circuit in accordance with the invention.

Referring in more detail to the drawing, FIG. 1 depicts a narrow-band frequency converter 8 employing an illustrative squelch control circuit constructed in accordance with the invention. It will be assumed that the converter operates with received intelligence in the form of a frequency modulated carrier although it will be evident that the circuitry to be described may be easily adapted for A.M. operation.

The converter 8 is provided with a main signal path in which a receiving antenna 9 is coupled to one or more R.F. amplifying stages 11. The stages 11, which amplify the low level of carrier signal intercepted by the antenna, are in turn connected to a mixer or converter stage 12 for mixing the modulated carrier with a suitable output signal from a local oscillator 13. The output of the mixer 12 is, therefore, an intermediate frequency signal which is amplified in one or more I.F. amplifier stages illustrated generally at 14. The bandwidth of the I.F. amplifier 14 is presumed to be equal to that of the modulating intelligence, and thereby establishes the noise bandwith and resulting sensitivity of the overall receiving system.

The output of the I.F. amplifier 14 is connected to an oscillator-limiter 15 which, in the presence of the carrier, functions as an ordinary limiter amplifier in the main signal path. The output of the oscillator-limiter 15 (hereafter called the oscillator 15) is connected to a variable I.F. attenuator 16, which normally controls the level of the I.F. signal output from the converter 8 so as not to overload the discriminator stage or other detection circuit of a receiver (not shown) to which the output of the converter 8 is generally coupled.

In the absence of a received carrier, the oscillator 15 is adjusted to oscillate at a frequency outside the passband of the I.F. amplifier 14 to provide a squelch control signal. This signal is utilized by coupling the output of the oscillator to a filter amplifier 17, whose bandwidth includes the oscillator frequency but rejects frequencies in the I.F. passband. The output of the filter amplifier 17 is connected to a control rectifier circuit 18, which rectifiers the filtered oscillator output signal and converts the latter into a D.C. control voltage. This voltage is impressed upon an electronic switch 19, which is adapted to discretely control the transmission characteristics of the I.F. attenuator 16. In particular, it will be assumed that the action of the switch 19 is such that the I.F. attenuator 16 is maintained in a relatively high impedance (non-transmitting) state when the D.C. control voltage applied to the switch is above a particular threshold and is switched into a relatively low impedance (transmitting) state when the D.C. control voltage drops below the threshold. In normal operatiton it will be further assumed that the threshold of the D.C. voltage is set so that the presence of an oscillator output signal at the filter 17 will normally assure a D.C. control voltage amplitude well above the threshold at the input of the switch 19.

When a carrier signal is received by a converter 8, the oscillator 15 ceases oscillation, which causes the D.C. control voltage at the input of switch 19 to fall below the threshold. This permits the attenuator 16 to pass the received message information, thereby "unsquelching" the converter 8.

Figure 2:
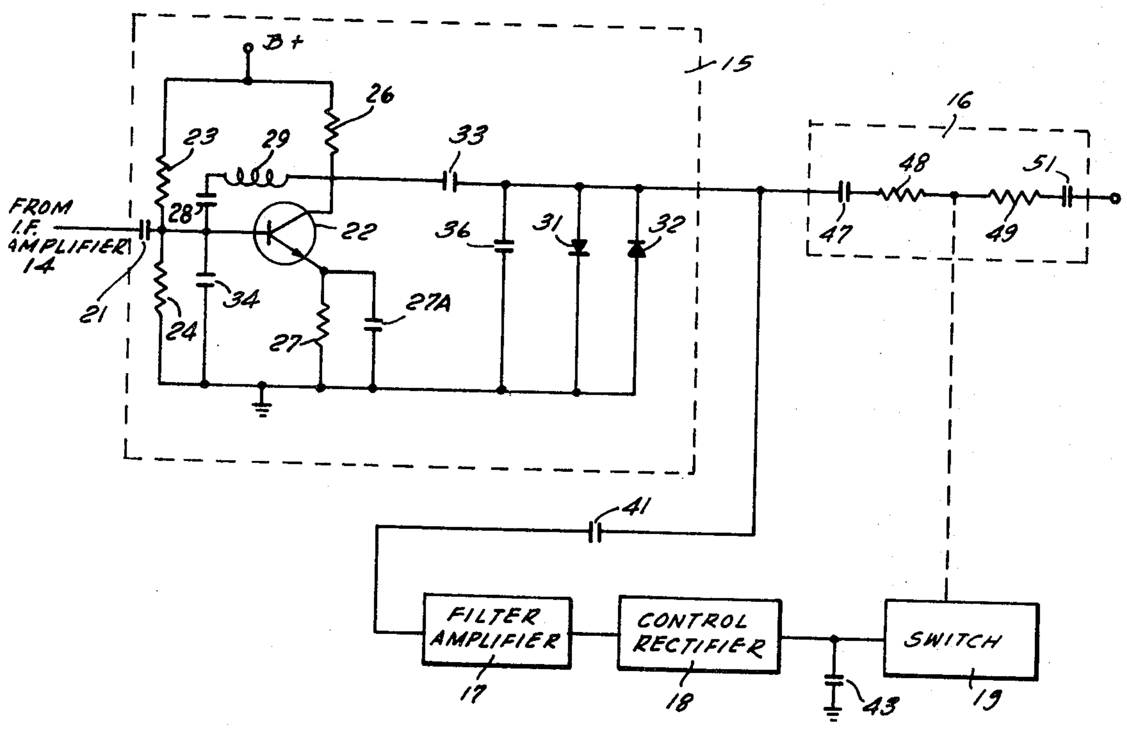
FIG. 2 is a combination block and schematic diagram showing circuit details of an oscillator-limiter network suitable for use in the squelch control circuit of FIG. 1.

The circuit of the oscillator 15 and the manner in which it controls the squelch of the converter output may be seen in more detail with the aid of FIG. 2. As shown, the output of the I.F. amplifier 14 is coupled to the input of the oscillator-limiter 15 through a capacitor 21. Illustratively, the oscillator 15 consists of a common-emitter, class A biased NPN transistor 22 having a pair of base biasing resistors 23 and 24, a collector biasing resistor 26, and an emitter biasing resistor 27. The emitter is bypassed for both the oscillator and the I.F. frequencies via a capacitor 27A. The frequency of the oscillator 15, which is primarily determined by a serially arranged, collector-to-base feed-back path including a capacitor 28 and an inductor 29 is chosen to be outside the I.F. passband.

A pair of limiter diodes 31 and 32 are coupled to the collector of the transistor 22 through a coupling capacitor 33. The effective output level of the transistor 22, in the absence of an I.F. signal applied thereto from the amplifier 14, is adjusted with the aid of the coupling capacitor 33, a base capacitor 34, and a diode shunting capacitor 36 to be lower than the conduction threshold level of the limiter diodes (hereafter referred to as the squelch threshold level).

For the purposes of this description, the effective output level of the transistor 22 is the sum of (a) the RMS output level of the transistor 22 when oscillating and (b) the RMS receiver noise within the I.F. passband, as seen at the diodes 31 and 32. This is illustrated more clearly in FIG. 3A, which depicts (for the oscillator arrangement shown in FIG. 2) the relationship between a squelch threshold level 37, an RMS output level 38 of the transistor 22 when operating an oscillator, and a level 39 representing the RMS value of receiver noise in the I.F. passband, when referred to the oscillator output. In the absence of an I.F. signal, the sum of the levels 38 and 39 is adjusted to be below the level 37. In such case, the diodes 31 and 32 (FIG. 2) present a high output impedance to the transistor 22, thereby assuring oscillation of the latter.

The voltage across the diodes 31 and 32 is coupled via a capacitor 41 to the above-mentioned filter amplifier 17, which amplifies the oscillator signal and rejects the I.F. signal (upon receipt of a carrier) so that the latter signal does not inadvertently provide the energizing voltage for its own squelch. The output of the filter amplifier 17 is rectified by the control rectifier 18, which produces the D.C. control voltage. The latter voltage, which is stored in a capacitor 43, is normally adjusted to a predetermined level 44 (FIG. 3B) that is above a given threshold level 46. The D.C. control voltage is impressed upon the switch 19 for controlling the transmission state of the I.F. attenuator 16 in the manner described above.

The voltage across the diodes 31 and 32 is also coupled to the attenuator 16, which illustratively comprises the series combination of a coupling capacitor 47, a pair of resistors 48 and 49, and a second coupling capacitor 51. When a D.C. control voltage above the threshold level 46 is applied to the input of the switch 19, the latter grounds the attenuator 16 at the junction of resistors 48 and 49. As a result, the voltage across the diodes 31 and 32 (including the RMS noise level in the I.F. passband, as indicated before) is coupled through the capacitor 47 and is attenuated by the now-grounded resistor 48. The unwanted noise at the output of the oscillator 15 is, therefore, prevented from passing through the attenuator 16, and the desired squelch action is achieved.

During the receipt of a carrier, however, the sum of the RMS oscillator output level 38 (FIG. 3A), the RMS noise level 39, and the I.F. signal level exceeds the squelch threshold level 37, whereupon the diodes 31 and 32 (FIG. 2) start conducting. As conduction increases, the output impedance of the transistor 22 decreases to a point where the oscillator "drops-out" or ceases to operate. When this condition is reached, the transistor 22 and the associated output diodes 31 and 32 act as a limiter amplifier stage. Upon the cessation of oscillation, the filter amplifier 17 supplies no usable output to the rectifier 18. As a result, the D.C. control voltage across the capacitor 43 drops below the threshold level 46 (FIG. 3B) toward zero. The resultant loss of D.C. control voltage at the input of the switch 19 causes the latter to remove the short circuit from the attenuator 16, thereby allowing passage of the message information therethrough. As soon as the I.F. signal is removed, the oscillator 16 restarts oscillation and the switch 19 again grounds the attenuator 16 to restore the squelch and complete the cycle of operation.

Figure 3A:
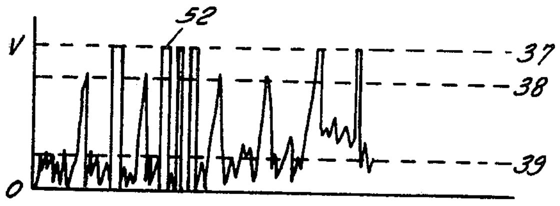
FIGS. 3A and 3B are diagrammatic representations of typical waveforms appearing at several points in the network of FIG. 2.
Figure 3B:
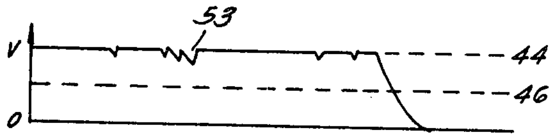

Additionally, the squelch control circuit of FIG. 2 is, to a large degree insensitive to noise impulses, such as those represented by a waveform 52 in FIG. 3A. Ordinarily, the noise impulses 52 contain frequency components within the I.F. passband, which would tend to "drop-out" the oscillator 15 and thertby operate to unsquelch the attenuator 16 by causing the D.C. control voltage on the capacitor 43 to dip below the threshold level 46 (FIG. 3B). However, because of (a) the long discharge time of the rectifier circuit 18 (FIG. 2) caused by the presence of the capacitor 43, and (b) the finite drop-out time of the oscillator 15, the dips in the D.C. control voltage (represented at 53 in FIG. 3B) caused by such noise impulses do not fall below the D.C. threshold level 46. Thus, such noise impulses are ineffective to unsquelch the attenuator 16 (FIG. 2).

With the arrangement described in connection with FIGS. 1–3, I.F. signals which lie below the squelch threshold level 37 (FIG. 3A) of the oscillator would normally be squelched along with the unwanted noise. Such loss results because of the necessity of maintaining a substantial differential between the squelch threshold level 37 and the noise level 39 in order to preclude the possibility of having the squelch control circuitry actuated by the noise level 39.

Figure 4:
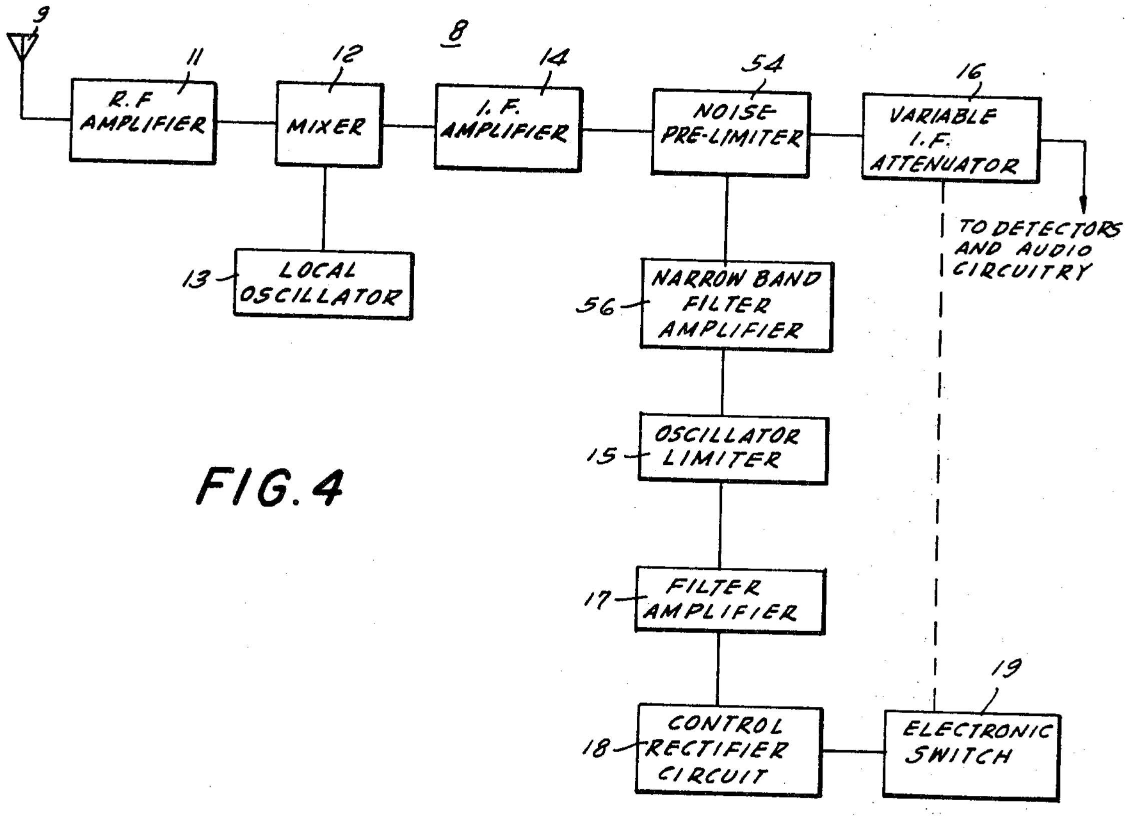
FIG. 4 is a block diagram, similar to FIG. 1, but including additional circuitry for maintaining a high signal-to-noise ratio in the receiver without increasing the likelihood of noise-triggered operation of the squelch control circuit.

FIG. 4 indicates a modification of the arrangement of FIGS. 1–3 for minimizing the loss of receiver sensitivity resulting from such differential while simultaneously assuring that the squelch control circuit will not be triggered by noise. The receiver components from the antenna through the I.F. amplifier, as well as the squelch circuit components and the I.F. attenuator, are identical in FIGS. 1 and 4 and have been given corresponding reference numerals. In FIG. 4, however, the oscillator 15 is disposed outside the main signal path of the converter and is coupled to the output of the I.F. amplifier 14 through a noise prelimiter 54 and a narrow-band filter-amplifier 56. The noise prelimiter 54 is interposed in the main signal path between the output of the I.F. amplifier 14 and the input of the variable attenuator 16. The prelimiter 54 is provided with sufficient gain to limit on the receiver noise occurring within the I.F. passband, so that only a small differential, if any, between the I.F. signal threshold and RMS noise level need be maintained in the main signal path. This permits transmission of I.F. signals having a magnitude equal to or greater than the receiver noise level within the I.F. passband.

On the other hand, the bandwidth of the filter 56, while centered about the I.F. frequency, is adjusted to be smaller than I.F. passband. The resultant increase in signal-to-noise ratio at the oscillator 15 permits the signal applied to the oscillator to be sufficiently above the RMS noise level seen by the limiter diodes so as to permit the squelch circuit components 17–19 to operate as previously described. Thus, carrier signals in the main signal path that are barely intelligible (i.e., near unity signal-to-noise ratio) will nevertheless permit reliable operation of the squelch circuit.

It is also possible to operate the circuit of FIG. 4 without the prelimiter 54, in which case the output of the I.F. amplifier 14 may be coupled directly to the input of the narrow-band filter 56 as well as to the input of the attenuator 16. The use of the prelimiter 54 is particularly advantageous, however, since it insures increased reliability by minimizing the bandwidth reduction required in the filter 56 with respect to the I.F. passband for a given differential between the squelch threshold level and the RMS noise level in the oscillator 15.

It will be observed that some type of prelimiting can also be advantageously employed in the arrangement of FIGS. 1 and 2. For example, noise prelimiter diodes (not shown) could be incorporated in the I.F. amplifier preceding the oscillator 15 to reduce the noise peak-to-RMS ratio seen at the limiter diodes, thereby obtaining some increase in receiver sensitivity.

In the foregoing, the invention has been described in connection with preferred embodiments therof. However, many other variations and modifications thereof, such as the use of similar squelch control apparatus in A.M. converters and in full A.M. or F.M. receivers (i.e., those including integral detecting and audio circuitry) will now become obvious to those skilled in the art. It is accordingly desired that the breadth of the claims not be limited to the specific disclosure herein contained.

What is claimed is:

1. In a communications network for processing a modulated carrier occupying a first frequency band that encompasses substantially the entire frequency passband of a main signal band in said network, an improved arrangement for suppressing the transmission of noise through said network in the absence of the carrier, which comprises:

a normally operative oscillator circuit coupled to said main signal path for generating a control signal having a frequency outside the passband;

means rendered effective by the control signal for squelching the output of said main signal path; and limiter means coupled to the output of said oscillator circuit and triggered by the carrier for deactivating said oscillator circuit to remove the control signal from said squelching means.

2. A network is defined in claim 1, in which said limiter means comprises a diode circuit having a conductive threshold that is above the total energy level at the input of said diode circuit in the absence of the carrier and below the total energy level at the input of said diode circuit in the presence of the carrier.

3. A network as defined in claim 1, in which said squelching means comprises filter means coupled to the output of said oscillator circuit for passing the control signal and for rejecting signals in the passband, and a rectifier circuit coupled to the output of said filter means for converting the control signal to a D.C. control voltage of an amplitude normally above a predetermined threshold value, the output of said main signal path being squelched when the D.C. voltage is above the predetermined value.

4. A network as defined in claim 3, is which said squelching means further comprises time delay means for maintaining the D.C. voltage above the predetermined value when noise impulses are present in said main signal path.

5. A network as defined in claim 4, in which said squelching means further comprises an externally controllable variable attenuator interposed in said main signal path and switching means coupled to the output of said rectifier circuit for switching said attenuator into a low impedance state when the D.C. voltage falls below the predetermined value.

6. A network as defined in claim 1, in which said oscillator circuit is directly interposed in said main signal path, said oscillator circuit being arranged to function as a limiter amplifier when deactivated by said limiter means.

7. A network as defined in claim 6, further comprising prelimiter means disposed in said main signal path, the output of said prelimiter means being coupled to the input of said oscillator circuit.

8. A network as defined in claim 1, in which said oscillator circuit is interposed in an auxiliary path, and said network further comprises filter means for coupling said main signal path to the input of said oscillator circuit, said filter means having a bandwidth centered upon and smaller than the passband.

9. In a network as defined in claim 8, further comprising prelimiter means interposed in said main signal path, the output of said prelimiter means being connected to the input of said filter means.

10. In a communications network for processing a modulated carrier occupying a first frequency band that encompasses substantially the entire passband of a main signal path in said network;

filter means having a bandwidth centered upon but smaller than the passband;

means for coupling said main signal path to the input of said filter means;

a normally operative oscillator circuit coupled to the output of said filter means for generating a control signal having a frequency outside the passband;

means rendered effective by the control signal for squelching the output of said main signal path; and limiter means coupled to the output of said oscillator circuit and triggered by an output from said filter means for deactivating said oscillator circuit to remove the control signal from said squelching means.

11. A network as defined in claim 10, in which said coupling means comprises prelimiter means interposed in said main signal path, the output of said prelimiter means being connected to the input of said filter means.

12. A network as defined in claim 10, in which said squelching means comprises means for converting the control signal to a D.C. control voltage of an amplitude normally above a predetermined threshold value, and time delay means for maintaining the D.C. voltage above the predetermined value when noise impulses are present in said main signal path.

References Cited

UNITED STATES PATENTS

| | | | | |
|---|---|---|---|---|
| 2,904,678 | 9/1959 | Malchow | 325—478 | XR |
| 2,992,327 | 7/1961 | Lennon | 325—478 | XR |
| 3,374,437 | 3/1968 | Heald | 325—348 | XR |

RICHARD MURRAY, Primary Examiner

K. W. WEINSTEIN, Assistant Examiner

U.S. Cl. X.R.

325—323, 348, 473